United States Patent
Shizuka

(10) Patent No.: US 10,983,521 B2
(45) Date of Patent: Apr. 20, 2021

(54) VEHICLE CONTROLLER, VEHICLE CONTROL METHOD, AND NON-TRANSITORY STORAGE MEDIUM STORING VEHICLE CONTROL PROGRAM

(71) Applicant: TOYOTA JIDOSHA KABUSHIKI KAISHA, Toyota (JP)

(72) Inventor: Satoshi Shizuka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/168,027

(22) Filed: Oct. 23, 2018

(65) Prior Publication Data
US 2019/0187713 A1 Jun. 20, 2019

(30) Foreign Application Priority Data
Dec. 18, 2017 (JP) .............................. JP2017-241650

(51) Int. Cl.
  *G05D 1/02* (2020.01)
  *G05D 1/00* (2006.01)
  *B60W 50/00* (2006.01)

(52) U.S. Cl.
  CPC ....... *G05D 1/0212* (2013.01); *B60W 50/0098* (2013.01); *G05D 1/0088* (2013.01);
  (Continued)

(58) Field of Classification Search
  CPC .. G05D 1/0212; G05D 1/0088; G05D 1/0248; G05D 1/0274; G05D 1/0278;
  (Continued)

(56) References Cited

U.S. PATENT DOCUMENTS 9,406,177 B2 * 8/2016 Attard .................. G07C 5/0808
2003/0018428 A1 * 1/2003 Knockeart ....... G08G 1/096861
                                                        342/357.31
(Continued)

FOREIGN PATENT DOCUMENTS

DE   102014217848 A1   3/2016
JP    2010-132056 A    6/2010
(Continued)

OTHER PUBLICATIONS

Machine Translation of WO2016139747 (Year: 2016).*
(Continued)

*Primary Examiner* — Anne Marie Antonucci
*Assistant Examiner* — Sahar Motazedi
(74) *Attorney, Agent, or Firm* — Oliff PLC

(57) ABSTRACT

A vehicle controller includes: an information acquiring unit configured to acquire one or more pieces of information for identifying a traveling state including a position of a vehicle or a condition of an object around the vehicle; an environment detecting unit configured to detect an environment in which the vehicle is located; an operation control unit configured to determine a reliability of the information, based on the information and a detection result of the environment detecting unit; and a control instruction generating unit configured to generate a control instruction for controlling an operation of the vehicle, based on the information and the reliability, and output the control instruction.

13 Claims, 2 Drawing Sheets

(52) U.S. Cl.
CPC ......... G05D 1/0248 (2013.01); G05D 1/0274 (2013.01); G05D 1/0278 (2013.01); *B60W 2420/42* (2013.01); *B60W 2420/52* (2013.01); *B60W 2552/00* (2020.02); *B60W 2555/20* (2020.02); *B60W 2556/50* (2020.02)

(58) Field of Classification Search
CPC ......... B60W 50/0098; B60W 2420/42; B60W 2420/52; B60W 2550/12; B60W 2550/14; B60W 2550/402
See application file for complete search history.

(56) References Cited

U.S. PATENT DOCUMENTS

| | | | | |
|---|---|---|---|---|
| 2008/0234927 | A1* | 9/2008 | O'Neill | G01C 21/34 701/465 |
| 2015/0217765 | A1* | 8/2015 | Tokoro | G01S 13/867 701/1 |
| 2016/0121889 | A1* | 5/2016 | Shimomura | B60W 50/14 701/41 |
| 2017/0232974 | A1* | 8/2017 | Nishida | B60W 50/14 701/24 |
| 2018/0022354 | A1* | 1/2018 | Akatsuka | B60W 30/18145 701/41 |
| 2018/0151066 | A1* | 5/2018 | Oba | G08G 1/096725 |
| 2018/0170374 | A1 | 6/2018 | Otsuka et al. | |
| 2018/0357493 | A1* | 12/2018 | Takamatsu | G08G 1/096725 |
| 2019/0064799 | A1* | 2/2019 | Amirloo Abolfathi | B60W 30/182 |

FOREIGN PATENT DOCUMENTS

| | | | | |
|---|---|---|---|---|
| JP | 2014106854 A | * | 6/2014 | |
| JP | 2017-047694 A | | 3/2017 | |
| KR | 20170067495 A | * | 6/2017 | |
| WO | WO-2016139747 A1 | * | 9/2016 | ............ B60W 50/14 |

OTHER PUBLICATIONS

Fox, K. "Impacts of Strong Solar Flares", May 13, 2013, NASA (Year: 2013).*
Machine Translation of JP-2014106854-A (Year: 2014).*
Machine Translation of DE102014217848A1 (Year: 2014).*
Machine Translation of KR20170067495A (Year: 2017).*

* cited by examiner

VEHICLE CONTROLLER, VEHICLE CONTROL METHOD, AND NON-TRANSITORY STORAGE MEDIUM STORING VEHICLE CONTROL PROGRAM

INCORPORATION BY REFERENCE

The disclosure of Japanese Patent Application No. 2017-241650 filed on Dec. 18, 2017 including the specification, drawings and abstract is incorporated herein by reference in its entirety.

BACKGROUND

1. Technical Field

The disclosure relates to a vehicle controller, a vehicle control method, and a non-transitory storage medium storing a vehicle control program.

2. Description of Related Art

Various automatic driving systems that recognize a position or a running state of a vehicle and an object other than a vehicle based on detection results from various sensors included in the vehicle and control traveling of the vehicle based on the recognition results have been proposed. Japanese Unexamined Patent Application Publication No. 2017-47694 (JP 2017-47694 A) discloses a vehicle controller that executes automatic driving control based on a first control signal indicating a track in which a risk potential for a host vehicle is low. In the vehicle controller disclosed in JP 2017-47694 A, when it is determined that the first control signal has an abnormality due to an abnormality in sensors, communication functions, or the like, automatic driving is performed based on a second control signal indicating a position and a speed which are relative to an external object. In this way, the reliability of automatic driving is complemented using different control signals.

SUMMARY

When an abnormality does not occur in sensors, there is concern that the reliability of the sensors may decrease in a predetermined environment and reliability of vehicle control may also decrease. In JP 2017-47694 A, a decrease in reliability of vehicle control in such a case cannot be prevented.

The disclosure provides a vehicle controller, a vehicle control method, and a non-transitory storage medium storing a vehicle control program that can curb a decrease in reliability of vehicle control when an abnormality has not occurred in sensors.

A first aspect of the disclosure provides a vehicle controller. The vehicle controller includes: an information acquiring unit configured to acquire one or more pieces of information for identifying a traveling state including a position of a vehicle or a condition of an object around the vehicle; an environment detecting unit configured to detect an environment in which the vehicle is located; an operation control unit configured to determine a reliability of the information, based on the information and a detection result of the environment detecting unit; and a control instruction generating unit configured to generate a control instruction for controlling an operation of the vehicle, based on the information and the reliability, and output the control instruction.

According to this configuration, it is possible to perform operation control in consideration of the reliability of the information acquired by the information acquiring unit according to the environment and to curb a decrease in reliability of vehicle control.

In the first aspect, the operation control unit may be configured to determine the operation of the vehicle based on the information and the reliability.

In the first aspect, the control instruction generating unit may be configured not to generate the control instruction when the information includes unreliable information of which a reliability is determined to be low.

According to this configuration, it is possible to stop operation control before a decrease in quality of operation control occurs when the reliability of the information is low.

In the first aspect, the control instruction generating unit may be configured to generate the control instruction without using unreliable information of which a reliability is determined to be low, when the information includes the unreliable information.

According to this configuration, it is possible to continuously perform operation control while curbing a decrease in quality of operation control even when the reliability of the information is low.

In the first aspect, the operation control unit may be configured to perform a plurality of processes by using the information, and the plurality of processes may be different from each other according to the reliability of the information.

According to this configuration, it is possible to continuously perform operation control while curbing a decrease in quality of operation control even when the reliability of the information is low.

In the first aspect, the operation control unit may be configured to determine the reliability of the information by using data in which each of a plurality of types of the information are associated with a specific environment in which the reliability is decreased.

In the first aspect, the plurality of types of the information may include camera-imaging data acquired from a camera mounted on the vehicle, and the operation control unit may be configured to determine that a reliability of the camera-imaging data is low when the environment detecting unit detects at least one of a fact that it is night and a fact that the vehicle is traveling in a tunnel.

According to this configuration, it is possible to appropriately determine the reliability of camera-imaging data.

In the first aspect, the plurality of types of the information may include LIDAR-received data acquired from a LIDAR device mounted on the vehicle, and the operation control unit may be configured to determine that a reliability of the LIDAR-received data is low when the environment detecting unit detects that it is raining or it is snowing.

According to this configuration, it is possible to appropriately determine the reliability of LIDAR-received data.

In the first aspect, the plurality of types of the information may include map data stored in the vehicle, and the operation control unit may be configured to determine that a reliability of the map data is low when the environment detecting unit detects that a road on which the vehicle is traveling is under construction.

According to this configuration, it is possible to appropriately determine the reliability of map data.

In the first aspect, the plurality of types of the information may include GPS-received data acquired from a GPS sensor mounted on the vehicle, and the operation control unit may be configured to determine that a reliability of the GPS-received data is low when the environment detecting unit detects that the vehicle is under an influence of solar flare.

According to this configuration, it is possible to appropriately determine the reliability of GPS-received data.

A second aspect of the disclosure provides a vehicle control method. The vehicle control method includes acquiring one or more pieces of information for identifying a traveling state including a position of a vehicle or a condition of an object around the vehicle; detecting an environment in which the vehicle is located; determining a reliability of the information, based on the information and a detection result regarding the environment; generating a control instruction for controlling an operation of the vehicle based on the information and the reliability; and outputting the control instruction.

According to this configuration, it is possible to perform operation control in consideration of the reliability of the information acquired by the information acquiring unit according to the environment and to curb a decrease in reliability of vehicle control.

A third aspect of the disclosure provides a non-transitory storage medium storing a vehicle control program, the vehicle control program causing a computer to perform at least: acquiring one or more pieces of information for identifying a traveling state including a position of a vehicle or a condition of an object around the vehicle; detecting an environment in which the vehicle is located; determining a reliability of the information, based on the information and a detection result regarding the environment; generating a control instruction for controlling an operation of the vehicle based on the information and the reliability; and outputting the control instruction.

According to this configuration, it is possible to perform operation control in consideration of the reliability of the information acquired by the information acquiring unit depending on the environment and to curb a decrease in reliability of vehicle control.

A fourth aspect of the disclosure provides a vehicle controller. The vehicle controller includes an electronic control unit configured to: acquire one or more pieces of information for identifying a traveling state including a position of a vehicle or a condition of an object around the vehicle; detect an environment in which the vehicle is located; determine a reliability of the information, based on the information and a detection result of the environment detecting unit generate a control instruction for controlling an operation of the vehicle, based on the information and the reliability, and output the control instruction.

As described above, according to the disclosure, it is possible to provide a vehicle controller, a vehicle control method, and a non-transitory storage medium storing a vehicle control program that can curb a decrease in reliability by detecting an environment of a vehicle, determining the reliability of information acquired from sensors or the like, and performing operation control based on the reliability even when an abnormality has not occurred in the sensors or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Summary

A vehicle controller according to the disclosure performs vehicle control based on information from sensors or the like and the reliability of the information which is determined based on an environment in which a vehicle is located. Accordingly, it is possible to curb a decrease in reliability of vehicle control in automatic driving or the like by performing operation control in consideration of the reliability of information acquired from the sensors or the like when an abnormality has not occurred in the sensors or the like.

Embodiment

Hereinafter, an embodiment of the disclosure will be described in detail with reference to the accompanying drawings.
<Configuration>

Figure 1:
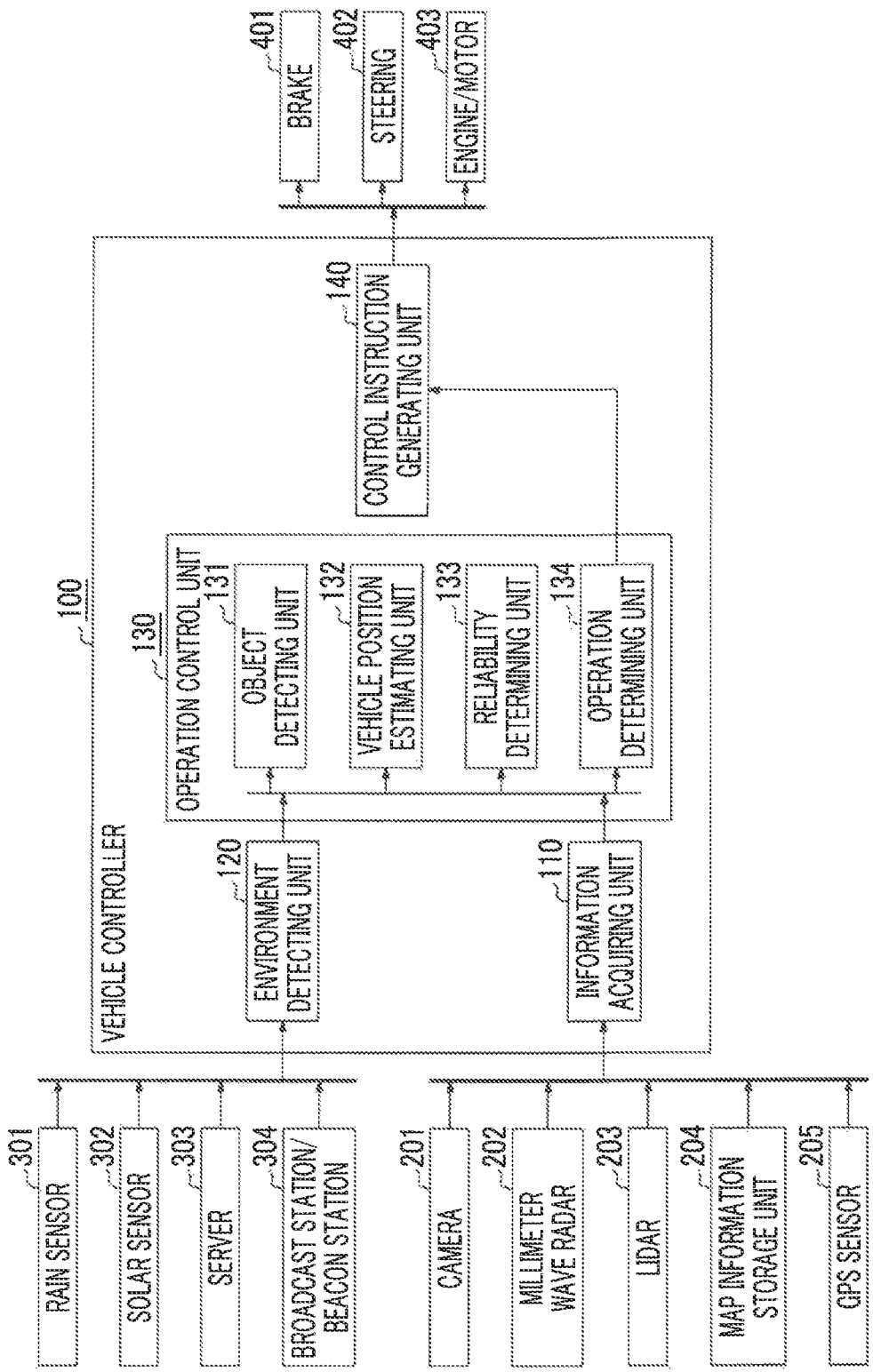
FIG. 1 is a functional block diagram of a vehicle controller according to an embodiment of the disclosure.

FIG. 1 is a functional block diagram of a vehicle controller 100 and peripheral units thereof according to this embodiment. The vehicle controller 100 is, for example, an automatic driving ECU that is mounted in a vehicle and includes an information acquiring unit 110, an environment detecting unit 120, an operation control unit 130, and a control instruction generating unit 140.

The information acquiring unit 110 acquires a variety of information for identifying a traveling state such as a position and a speed of the vehicle and conditions of objects around the vehicle. Such information is position information based on camera-imaging data for the surroundings of the vehicle imaged by a camera 201 mounted in the vehicle, millimeter wave radar-received data and LIDAR-received data due to emission from a millimeter wave radar 202 and a LIDAR 203 and reflection and reception from an object, map data stored in a map information storage unit 204, or GPS information received from a GPS sensor 205. The information acquiring unit 110 acquires such information and performs processing such as correction thereon if necessary. The map information may be acquired from a server or the like which is installed outside the vehicle.

The environment detecting unit 120 detects an environment in which the vehicle is located. The environment detecting unit 120 detects the weather around the vehicle, for example, based on outputs of a rain sensor 301 and a solar sensor 302 which are mounted in the vehicle. The environment detecting unit 120 acquires, for example, the current date and time, roadwork information, road information, the weather, or occurrence conditions of solar flare based on radio information from a server 303 or a broadcast station or a beacon station 304 outside the vehicle.

The operation control unit 130 includes an object detecting unit 131, a vehicle position estimating unit 132, a reliability determining unit 133, and an operation determining unit 134. The object detecting unit 131 detects conditions such as presence of an object around the vehicle and the position and the speed of the vehicle, for example, based on the camera-imaging data, the millimeter wave radar-received data, and the LIDAR-received data acquired by the information acquiring unit 110. The vehicle position estimating unit 132 estimates conditions such as the position and the speed of the vehicle, for example, based on the map data and the position information acquired by the information acquiring unit 110. The reliability determining unit 133 determines the reliability of the information acquired by the information acquiring unit 110 based on the detection results from the environment detecting unit 120. The operation determining unit 134 determines the operation of the vehicle in automatic driving or the like based on the determination results from the reliability determining unit 133, the determination results from the object detecting unit 131, and the estimation results from the vehicle position estimating unit 132. The object detecting unit 131 and the vehicle position estimating unit 132 may also use the determination results from the reliability determining unit 133 for processing thereof.

The control instruction generating unit 140 generates a control instruction based on the operation of the vehicle determined by the operation determining unit 134. The control instruction is, for example, information instructing at least one of a brake 401, a steering 402, and an engine or motor 403 to apply a braking force, a steering force, and a driving force to the vehicle. The control instruction generating unit 140 outputs the generated control instruction to the units. The brake 401, the steering 402, and the engine or motor 403 apply a braking force, a steering force, and a driving force to the vehicle based on the output control instruction.

<Process Routine>

Figure 2:
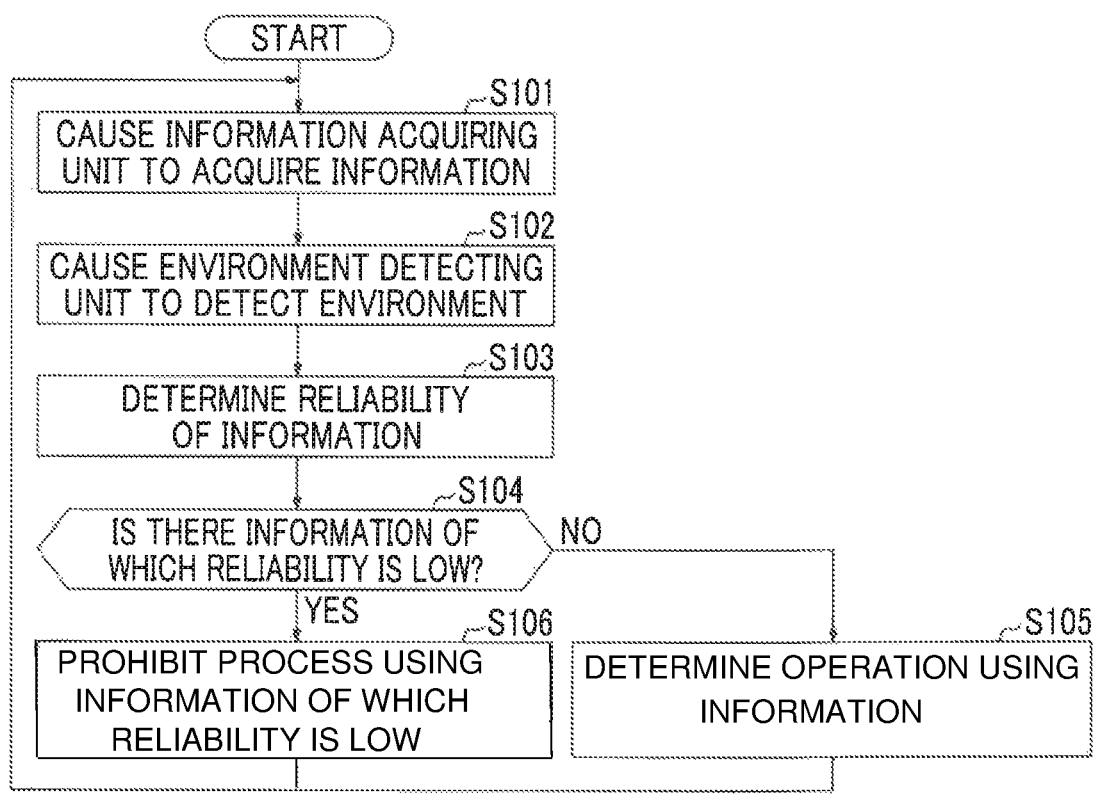
FIG. 2 is a flowchart illustrating an example of a process routine which is performed by the vehicle controller according to the embodiment of the disclosure.

A process routine which is performed by the vehicle controller 100 according to this embodiment will be described. FIG. 2 is a flowchart illustrating an example of the process routine which is performed by the vehicle controller 100. This flowchart is started, for example, when a user activates an automatic driving function.

(Step S101) The information acquiring unit 110 acquires a variety of information for identifying a traveling state such as a position and a speed of the vehicle or conditions of objects around the vehicle.

(Step S102) The environment detecting unit 120 detects an environment in which the vehicle is located.

(Step S103) The reliability determining unit 133 of the operation control unit 130 determines whether there is a likelihood that the reliability of the information acquired by the information acquiring unit 110 in Step S101 based on the environment detected by environment detecting unit 120 in Step S102 is low. Examples of an environmental factor causing a decrease in reliability by information types are described in Table 1. A type of information may be determined depending on a type of a sensor that acquires the information. For example, information acquired from camera-imaging data and information acquired from LIDAR-received data may be determined to be different types of information.

TABLE 1

| Type of information | Environmental factor |
| --- | --- |
| Camera-imaging data | At night, in a tunnel |
| LIDAR-received data | Rainy, snowy |
| Map data | Under roadwork, update of land use plan |
| GPS data | Solar flare |

As shown in Table 1, the reliability of camera-imaging data is considered to be low at the night or in a tunnel in which a field of view is darkened. The reliability of LIDAR-received data is considered to be low when it is raining or it is snowing, which serves as an obstacle of a path of light. The reliability of map data is considered to be low in a road under roadwork (construction) or in a region in which a land use plan has been updated, which provide a high likelihood that a shape of a road or the like will be updated. The reliability of GPS information is considered to be low when solar flare causing disturbance of the ionosphere occur.

The reliability determining unit 133 can perform determination based on data indicating a correlation between information and an environment in which the reliability of the information is low, which is shown in Table 1. In this data, an environment may be correlated with each information type or information may be correlated with each environment type. This data may be provided and updated from the outside. Reliability may be determined by binary values of YES/NO or, for example, a plurality of threshold values may be provided for each environment type such that threshold values indicating levels of rainfalls such as amounts of rainfalls are provided for rain and the reliability may be determined by three or more scores depending on the levels. The correlation shown in Table 1 is an example and the correlation is not limited thereto.

(Step S104) The process routine transitions to Step S105 when the reliability determining unit 133 determines that the reliability of any information has not decreased in Step S103, and transitions to Step S106 when it is determined that the reliability of certain information has decreased.

(Step S105) In this step, for example, a vehicle operation for automatic driving is determined using the variety of information. As described above, the object detecting unit 131 detects conditions such as presence, a position, and a speed of an object around the vehicle, for example, based on camera-imaging data, millimeter wave radar-received data, LIDAR-received data which are acquired by the information acquiring unit 110. The vehicle position estimating unit 132 estimates conditions such as a position and a speed of the vehicle, for example, based on map data and position information acquired by the information acquiring unit 110. The operation determining unit 134 determines an operation of the vehicle based on the determination result from the reliability determining unit 133, the detection result from the object detecting unit 131, and the estimation result from the vehicle position estimating unit 132. The control instruction generating unit 140 generates and outputs a control instruction for performing the determined operation of the vehicle. After this step has been performed, by returning to Step S101 and repeatedly performing the processes of the flowchart, it is possible to continue to perform driving control.

(Step S106) In this step, processes using information of which the reliability has been determined to be low are prohibited in comparison with the process of Step S105 in the object detecting unit 131, the vehicle position estimating unit 132, or the operation determining unit 134. Examples thereof will be described below.

Example 1

When automatic driving is being performed, the automatic driving is stopped. Accordingly, the automatic driving can be stopped before the reliability of automatic driving is lowered. In this case, a user may be notified of a message indicating that automatic driving is to be stopped using an alarm unit which is not illustrated. Alternatively, when automatic driving has not been yet started, a user may be notified of a message indicating that automatic driving is not possible. For example, only some driving assist functions which can be realized by processes not using the information of which the reliability has been determined to be low may be activated.

Example 2

When automatic driving is being performed, the automatic driving is continuously performed without using the information of which the reliability has been determined to be low. In an automatic driving process, this example can be employed, for example, when a plurality of algorithms using different types of information are independently performed, the operation of the vehicle is determined by majority decision or weighted evaluation for the results of the algorithms, and processes capable of continuously performing the automatic driving are performed without using some information. In this case, by using only information of which the reliability has not been determined to be low without using the information of which the reliability has been determined to be low, it is possible to enhance reliability of the determination of an operation or to curb at least a decrease in reliability. When reliability of information has decreased such that it is difficult to perform the determination of operation, similarly to Example 1, the automatic driving may be stopped, or only some driving assist functions which can be realized by processes not using the information of which the reliability has been determined to be low may be activated.

Example 3

Automatic driving is continuously performed also using the information of which the reliability has been determined to be low for the processes. The process results using the information of which the reliability has been determined to be low are used with a less weighting in the weighted evaluation, that is, different processes or handling is performed depending on the reliability. Accordingly, it is possible to enhance reliability of the determination of an operation or to curb at least a decrease in reliability. The information of which the reliability has been determined to be low may not be used to determine the operation of the vehicle but may be used for other processes. Validity of the determination of a decrease in reliability may be verified, for example, by comparing a calculation result when the information of which the reliability has been determined to be low is not used for the conditions such as presence, a position, and a speed of an object around the vehicle, the conditions such as a position and a speed of the vehicle, and the operation determined based thereon with a calculation result when the information is used, and correlation data between an information type and an environment (or a threshold value thereof) which is shown in Table 1 may be updated. Information which is acquired when the reliability is determined to be low may be stored and may be used as a reference value such as a previous value or an initial value in processes after the reliability has been recovered.

As in this step, by prohibiting processes using the information of which the reliability has been determined to be low, it is possible to prevent a decrease in quality of automatic driving. As a result, when a calculation load can be reduced, it is possible to reduce a load, an amount of heat generated, and power consumption of a processor. After this step has been performed, the driving control may be continuously performed by returning to Step S101 and repeatedly performing the processes of the flowchart.

While an embodiment of the disclosure has been described above, the disclosure is not limited to the embodiment and can be appropriately modified. For example, the methods of acquiring or detecting the information acquired by the information acquiring unit 110, the configuration of the environment detecting unit 120, or the type of environment detected thereby are not limited. A sensor itself included in the vehicle may determine the reliability of the sensor based on detection results from other sensors. For example, the camera 201 may determine reliability of camera-imaging data based on the outputs from the rain sensor 301 and the solar sensor 302 and output the determination result along with the camera-imaging data to the vehicle controller 100.

Advantageous Effects

As described above, according to the disclosure, even when an abnormality has not occurred in sensors or the like, it is possible to detect an environment of the vehicle, to determine reliability of information acquired from the sensors or the like, to perform vehicle control based on the reliability, and to appropriately perform vehicle control depending on an environment.

The disclosure can be understood as a vehicle controller, can also be understood as a vehicle control method in which a computer in a vehicle controller including a control unit and a storage unit performs the functions of the above-mentioned units or a vehicle control program in which the processes of the vehicle control method are described.

The disclosure can be usefully used for control of a vehicle or the like.

What is claimed is:

1. A vehicle controller comprising:
an electronic control unit configured to
    acquire multiple pieces of information, from a sensor, for identifying a traveling state including a position of a vehicle or a condition of an object around the vehicle, wherein the sensor outputs the multiple pieces of information without abnormality;
    detect an environment in which the vehicle is located;
    determine a reliability of the multiple pieces of information, based on the multiple pieces of information, a detection result, and data which are provided and updated from outside the vehicle, the data indicating a correlation between the multiple pieces of information and an environment in which the reliability of the multiple pieces of information is low;
    generate a control instruction for controlling an operation of the vehicle, based on the multiple pieces of information and the reliability,
    not output the control instruction when any one piece of the multiple pieces of information is determined to have low reliability; and
    validate the reliability of the any one piece of the multiple pieces of information determined to have low reliability by comparing a first calculation result and a second calculation result, the first calculation result using the any one piece of the multiple pieces of information determined to have low reliability and the second calculation result not using the any one piece of the multiple pieces of information determined to have low reliability.

2. The vehicle controller according to claim 1, wherein the electronic control unit is further configured to determine the operation of the vehicle based on the multiple pieces of information and the reliability.

3. The vehicle controller according to claim 1, wherein
the electronic control unit is further configured to perform
a plurality of processes by using the multiple pieces of
information, the plurality of processes being different
from each other according to the reliability of the
multiple pieces of information.

4. The vehicle controller according to claim 1, wherein
in the data, each of a plurality of types of the multiple
pieces of information are associated with a specific
environment in which the reliability is decreased.

5. The vehicle controller according to claim 4, wherein
the plurality of types of the multiple pieces of information
includes camera-imaging data acquired from a camera
mounted on the vehicle, and
the electronic control unit is further configured to determine that a reliability of the camera-imaging data is
low when at least one of it is night and the vehicle is
traveling in a tunnel.

6. The vehicle controller according to claim 4, wherein
the plurality of types of the multiple pieces of information
includes LIDAR-received data acquired from a LIDAR
device mounted on the vehicle, and
the electronic control unit is further configured to determine that a reliability of the LIDAR-received data is
low when it is raining or it is snowing.

7. The vehicle controller according to claim 4, wherein
the plurality of types of the multiple pieces of information
includes map data stored in the vehicle, and
the electronic control unit is further configured to determine that a reliability of the map data is low when a
road on which the vehicle is traveling is under construction.

8. The vehicle controller according to claim 4, wherein
the plurality of types of the multiple pieces of information
includes GPS-received data acquired from a GPS sensor mounted on the vehicle, and
the electronic control unit is further configured to determine that a reliability of the GPS-received data is low
when the vehicle is under an influence of solar flare.

9. The vehicle controller according to claim 1, wherein
the electronic control unit is further configured to determine whether the reliability of the multiple pieces of
information has been decreased by using the data.

10. A vehicle control method comprising:
acquiring multiple pieces of information, from a sensor,
for identifying a traveling state including a position of
a vehicle or a condition of an object around the vehicle,
wherein the sensor outputs the multiple pieces of
information without abnormality;
detecting an environment in which the vehicle is located;
determining a reliability of the multiple pieces of information, based on the multiple pieces of information, a
detection result, and data which are provided and
updated from outside the vehicle, the data indicating a
correlation between the multiple pieces of information
and an environment in which the reliability of the
multiple pieces of information is low;
generating a control instruction for controlling an operation of the vehicle, based on the multiple pieces of
information and the reliability;
not outputting the control instruction when any one piece
of the multiple pieces of information is determined to
have low reliability; and
validating the reliability of the any one piece of the
multiple pieces of information determined to have low
reliability by comparing a first calculation result and a
second calculation result, the first calculation result
using the any one piece of the multiple pieces of
information determined to have low reliability and the
second calculation result not using the any one piece of
the multiple pieces of information determined to have
low reliability.

11. The vehicle control method according to claim 10,
further comprising
determining whether the reliability of the multiple pieces
of information has been decreased by using the data.

12. A non-transitory storage medium storing a vehicle
control program, the vehicle control program causing a
computer to perform at least:
acquiring multiple pieces of information, from a sensor,
for identifying a traveling state including a position of
a vehicle or a condition of an object around the vehicle,
wherein the sensor outputs the multiple pieces of
information without abnormality;
detecting an environment in which the vehicle is located;
determining a reliability of the multiple pieces of information, based on the multiple pieces of information, a
detection result, and data which are provided and
updated from outside the vehicle, the data indicating a
correlation between the multiple pieces of information
and an environment in which the reliability of the
multiple pieces of information is low;
generating a control instruction for controlling an operation of the vehicle, based on the multiple pieces of
information and the reliability;
not outputting the control instruction when any one piece
of the multiple pieces of information is determined to
have low reliability; and
validating the reliability of the any one piece of the
multiple pieces of information determined to have low
reliability by comparing a first calculation result and a
second calculation result, the first calculation result
using the any one piece of the multiple pieces of
information determined to have low reliability and the
second calculation result not using the any one piece of
the multiple pieces of information determined to have
low reliability.

13. The non-transitory storage medium according to claim
12, wherein the vehicle control program further causes the
computer to perform:
determining whether the reliability of the multiple pieces
of information has been decreased by using the data.

* * * * *